(12) United States Patent
Van De Weijer-Wagemans et al.

(10) Patent No.: US 8,980,141 B2
(45) Date of Patent: Mar. 17, 2015

(54) ELECTROWETTING ELEMENTS

(75) Inventors: Melanie Maria Hubertina Van De Weijer-Wagemans, Aarle-Rixtel (NL); Romaric Massard, Eindhoven (NL); Robert A. Hayes, Sai Kung (HK)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/051,119

(22) Filed: Mar. 18, 2011

(65) Prior Publication Data

US 2011/0226998 A1 Sep. 22, 2011

Related U.S. Application Data

(63) Continuation of application No. PCT/EP2009/062160, filed on Sep. 18, 2009.

(30) Foreign Application Priority Data

Sep. 19, 2008 (GB) .................................. 0817175.3

(51) Int. Cl.
| | |
|---|---|
| *G02B 5/23* | (2006.01) |
| *C07C 211/57* | (2006.01) |
| *G02B 1/06* | (2006.01) |
| *H01B 1/12* | (2006.01) |
| *G02B 26/00* | (2006.01) |
| *C09B 1/28* | (2006.01) |
| *C09B 1/515* | (2006.01) |
| *C09B 5/02* | (2006.01) |

(52) U.S. Cl.
CPC ................ *G02B 26/004* (2013.01); *C09B 1/28* (2013.01); *C09B 1/285* (2013.01); *C09B 1/515* (2013.01); *C09B 5/028* (2013.01)
USPC ................... 252/586; 252/500; 8/636; 8/663; 8/675; 516/198; 516/203; 516/204; 345/41; 345/60; 359/229; 359/665

(58) Field of Classification Search
USPC ............................................................. 8/636
See application file for complete search history.

(56) References Cited

U.S. PATENT DOCUMENTS

| | | | |
|---|---|---|---|
| 2,321,767 A * | 6/1943 | Ogilvie | 552/258 |
| 2,399,355 A | 4/1946 | Klein | |
| 3,557,154 A * | 1/1971 | Neeff et al. | 552/223 |
| 4,110,238 A * | 8/1978 | Lala | 510/343 |
| 4,376,077 A | 3/1983 | Schoenauer et al. | |
| 4,499,004 A * | 2/1985 | Haas et al. | 252/299.1 |
| 5,205,840 A | 4/1993 | Friswell et al. | |
| 5,679,808 A * | 10/1997 | Mizoguchi et al. | 552/223 |
| 6,930,818 B1 | 8/2005 | Liang et al. | |
| 2004/0082801 A1 | 4/2004 | Jaeger et al. | |
| 2006/0290653 A1* | 12/2006 | Kawahara et al. | 345/107 |
| 2007/0187242 A1* | 8/2007 | Nair et al. | 204/450 |
| 2008/0206658 A1 | 8/2008 | Hall-Goulle et al. | |

FOREIGN PATENT DOCUMENTS

| | | |
|---|---|---|
| CN | 1818768 | 8/2006 |
| CN | 101027348 | 8/2007 |
| JP | 2007133398 A2 | 5/2007 |
| JP | 2007531917 A | 8/2007 |
| WO | 03/071346 A1 | 8/2003 |
| WO | 2005/098524 A1 | 10/2005 |
| WO | 2005/098797 A2 | 10/2005 |
| WO | 2006/011101 A1 | 2/2006 |
| WO | 2006/089809 A1 | 8/2006 |
| WO | 2007054710 A2 | 5/2007 |
| WO | 2008/142086 A1 | 11/2008 |

OTHER PUBLICATIONS

"Material Safety Data Sheet for Oil Blue N", attached as a PDF, dated Oct. 3, 2005, accessed online at http://www.coleparmer.com/Assets/Msds/98594.htm.*

Bloom et al., "Spectroscopic Studies of Keto-enol Equilibria—XII: Reduced Amino-Naphthoquinones," Tetrahedron, vol. 26, No. 6, 1970, pp. 1267-1274.

Farina et al., "Polycyclic Hydroxyquinones : XXIV1 Diels-Alder Reactions of 5-amino-8-hydroxy-1,4-naphthoquinone. Novel Transcycloaddition Reactions with Derivatives of 1,4-dihydro-1, 4-methanoanthracene-9,10-dione," Tetrahedron, vol. 42, No. 15, 1986, pp. 4309-4318.

Fariña et al., "Synthesis of 5-Amino-8-hydroxyl-1,4-naphthoquinone and Derivatives," Communications, Aug. 1985, 99. 781-784.
Lord et al., "Alkylaminoanthraquinones as Dyes for Polypropylene Fibres," J. Appl. Chem. Biotechnol., vol. 27, 1977, pp. 362-368.
Morris et al., "Some Experiments with Aminodihydroxyanthraquinones," Tetrahedron, vol. 42 No. 12, Jan. 1, 1986, pp. 3303-3309.
Peters et al., "231. New Intermediates and Dyes. Part VIII. 1,4-Disubstituted Derivatives of 2-butylanthraquinone: Dyes for Cellulose Acetate Rayon, Nylon, and Terylene," Journal of the Chemical Society (Resumed), 1960, pp. 1125-1130.
Preat, "Elaboration of a Theoretical Procedure for the Evaluation and Prediction of the Carbonyl Dyes Colour," English Abstract, Dissertation Doctorale en Science Chimiques, Mar. 14, 2008, Laboratoire de Chimie Théorique Appliquée, 164 pages.
Wood et al., "667. New Intermediates and Dyes. Part IX. Reactions of 2-methyl-1-nitro- and 1-amino-2-methyl-anthraquinone; Derived Dyes for Cellulose Acetate rayon," Journal of the Chemical Society (Resumed), 1962, pp. 3373-3378.
Yates et al., "101. New intermediates and Dyes. Part X. Preparation and Reactions of 2-n-alkylquinizarins," Journal of the Chemical Society (Resumed), 1965, pp. 626-629.
State Intellectual Property Office of P.R.C, "Search Report" for application serial No. 200980136451.5, dated Nov. 29, 2012.
Roques-Carmes et al, "Liquid behavior inside a reflective display pixel based on electrowetting", Journal of Applied Physics, American Institute of Physics, vol. 95, No. 8, Apr. 15, 2004.

* cited by examiner

*Primary Examiner* — Harold Pyon
*Assistant Examiner* — Katie L Hammer
(74) *Attorney, Agent, or Firm* — BainwoodHuang

(57) ABSTRACT

A dye for a fluid of an electrowetting element, the dye having a general formula selected from the group consisting of:

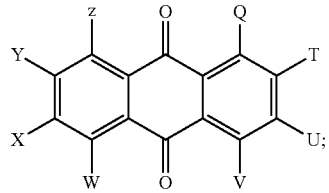

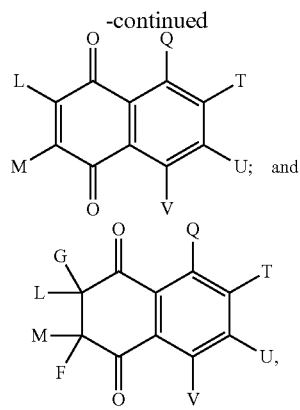

wherein Q has the general formula: -Het1R1 or -Het1R1R2;
V has the general formula: -Het2R3 or -Het2R3R4;
Het1 and Het2 are heteroatoms;
R1 and R3 are H;
R2 and R4 are any functional group;
T and U are any functional group;
W, X, Y and Z are H or an alkyl group; and
F, G, L and M are H or an alkyl group, and
with the proviso that the dye does not have the general formula:

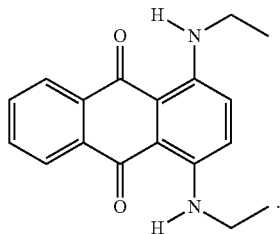

The present invention further relates to a fluid comprising a dye of the present invention, an electrowetting element and an optical display device comprising the fluid, and a use of the dye to reduce photo-bleaching.

24 Claims, 1 Drawing Sheet

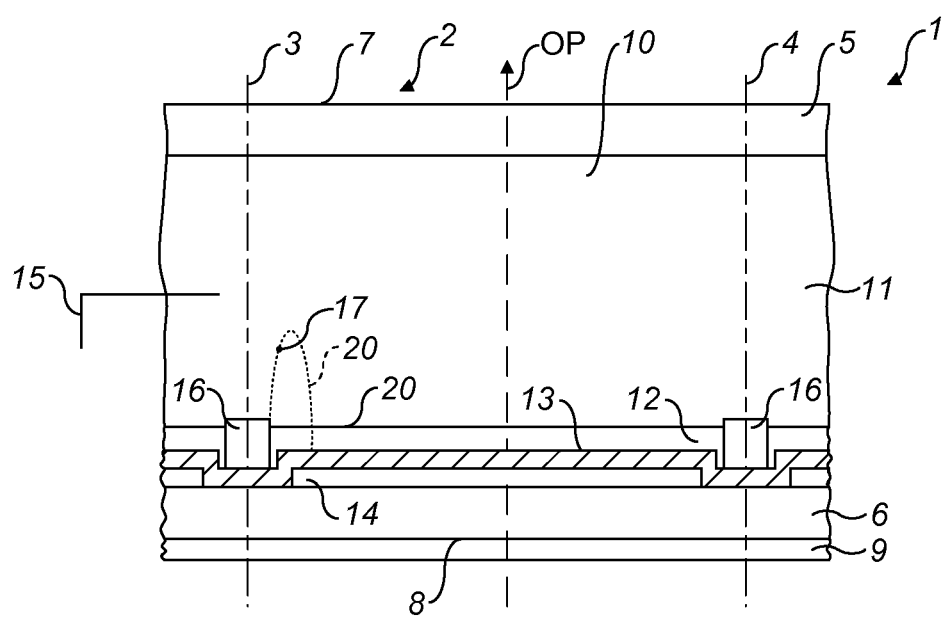

ELECTROWETTING ELEMENTS

CROSS REFERENCE TO RELATED APPLICATIONS

This patent application is a Continuation of International Patent Application No. PCT/EP2009/062160 filed on Sep. 18, 2009, entitled, "IMPROVEMENTS IN RELATION TO ELECTROWETTING ELEMENTS", which claims priority to GB0817175.3 filed Sep. 19, 2008, the contents and teachings of which are hereby incorporated by reference in their entirety.

FIELD OF THE INVENTION

The present invention relates to electrowetting elements and optical display devices.

BACKGROUND OF THE INVENTION

Electrowetting display devices are known, for example from international patent application no. WO 2003/071346. In an off state of such a display device an oil covers the area of a pixel of the display. In an on state the oil is retracted so as not to cover the pixel area. To switch the pixel into the on state a voltage is applied across the oil via an electrically conductive fluid immiscible with the oil, which exerts an electrostatic force on the conductive fluid, and to switch the pixel into the off state the voltage is switched off. Thus, for example, where the oil is coloured, a radiation beam passing through the pixel when in the off state passes through the oil and is imparted with colour, but does not pass through the oil with the pixel in the on state and so its colour remains substantially unchanged.

The oil may be coloured using a dye. The colour of the dye may however fade over a period of time, due to prolonged exposure to radiation such as ultra violet radiation. This process is known as photo-bleaching. Consequently, the colour imparted into the radiation beam passing through the pixel changes and/or becomes weaker over time from that desired. The display device therefore provides over time an increasingly deteriorated image to a viewer.

It is an object of the present invention to reduce this disadvantage.

SUMMARY OF THE INVENTION

The present invention provides a dye for a fluid of an electrowetting element, the dye having a general formula selected from the group consisting of:

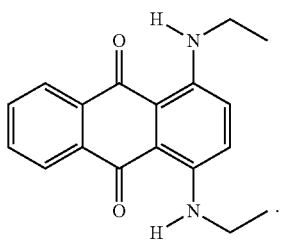

wherein Q has the general formula: -Het1R1 or -Het1R1R2;
V has the general formula: -Het2R3 or -Het2R3R4;
Het1 and Het2 are heteroatoms;
R1 and R3 are H;
R2 and R4 are any functional group;
T and U are any functional group;
W, X, Y and Z are H or an alkyl group; and
F, G, L and M are H or an alkyl group, and
with the proviso that said dye does not have the general formula:

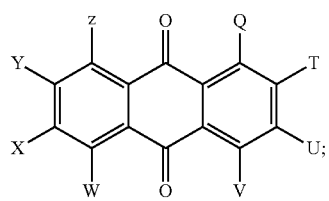

The dyes of the present invention include anthraquinone dyes and naphthoquinone dyes having a reduced, or no, susceptibility to photo-bleaching. An electrowetting element of an optical display device including an anthraquinone dye and/or a naphthoquinone dye of the present invention thus provides high quality images, with a reduced, or without, deterioration over time of the colour imparted by the element into a radiation beam passing through the element. Accordingly, such an element can continue to provide a high quality image over a period of time. Such a period of time may be at least an operational lifetime of the electrowetting element as that is common in the industry. The operational lifetime is typically confirmed by industry standard accelerated tests and can be translated into application lifetimes of several years, assuming industry standard usage modes.

Anthraquinone dyes and naphthoquinone dyes may undergo photo-bleaching upon exposure to radiation with wavelengths of for example the ultra violet or visible spectrum. An exemplary photo-bleaching reaction of an anthraquinone dye is indicated below:

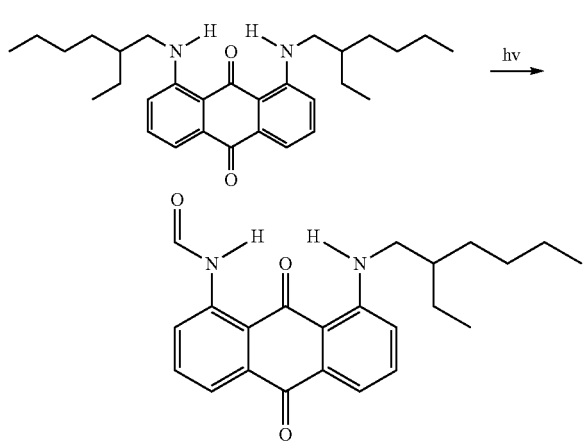

Without being limited to any theory, it is believed that, upon exposure to radiation energy hv, the initial anthraquinone dye undergoes a hydroxylation of the alkyl carbon atom adjacent the left hand nitrogen atom. This yields a photo-bleached molecule with the original alkyl group of the left hand alkyl amine now substituted with the group —CHO. For such a photo-bleaching reaction to occur, oxygen needs to be present in the reaction system. Such a photo-bleaching reaction changes the colour of the original dye, in this case from a magenta colour.

Anthraquinone dyes are known for use in electrowetting displays; see for example PCT patent application no. WO/2005/098524. However, there is no teaching in this document of anthraquinone dyes selected on the basis of their photo-bleaching properties.

PCT patent application no. PCT/EP2008/056211 describes anthraquinone dyes in the context of reducing backflow in an electrowetting element. The anthraquinone dye described therein as Example 2 is excluded from the anthraquinones of the present invention. Backflow is explained in more detail below.

The anthraquinone dyes and naphthoquinone dyes of the present invention are a selection from the general class of anthraquinone dyes and naphthoquinone dyes, respectively. In particular, referring to the above schematic drawings of the general formula of the dyes of the present invention, the selected anthraquinone dyes of the invention do not include a heteroatom on the left hand benzene ring of the anthraquinone. In identifying the selection of dyes, the insight of the inventors lies in understanding the reaction mechanism leading to photo-bleaching of anthraquinone and naphthoquinone dyes, and therefore identifying anthraquinones and naphthoquinones which are resistant, if not immune, to photo-bleaching. Further details of the mechanism of photo-bleaching will be explained later. In addition, they have realised that the dyes of the invention may meet other criteria desirable for their use in an electrowetting element, as explained later.

A heteroatom referred to for Het1 and Het2 may be any of the following: N, P, As, Sb, O, S, Se, Te.

In preferred embodiments of the invention, at least one of R2, R4, T and U is H or an optionally branched and/or optionally cyclic alkyl group comprising 1 to 20 carbon atoms.

Preferably, T and U may be H.

In preferred embodiments any one of R2, R4, T and U include a cyclic alkyl group selected from the group consisting of: cyclo-pentane, cyclo-hexane and cyclo-heptane.

Moreover, in other embodiments, R2 and R4 are both optionally branched and/or optionally cyclic alkyl groups comprising 1 to 20 carbon atoms.

Advantageously, the H of each of R1 and R3 may be arranged to form a bridging interaction with a C═O group of said dye. Without being bound by any theory, it is believed that through this mechanism the dye has a reduced susceptibility to photo-bleaching, as explained later.

In exemplary embodiments, at least one of Q and V has a formula selected from the group consisting of: —OH, —NHR2 or —NHR4.

In certain embodiments, the dye has the general formula:

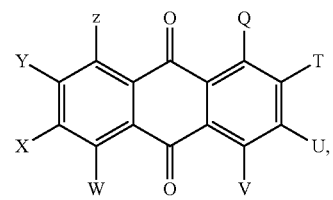

wherein at least one of W, X, Y and Z is H or an optionally branched and/or optionally cyclic alkyl group comprising 1 to 20 carbon atoms.

Preferably, any one of W, X, Y and Z may include a cyclic alkyl group selected from the group consisting of: cyclo-pentane, cyclo-hexane and cyclo-heptane. Alternatively, W, X, Y and Z may be H.

For example, in preferred embodiments, the dye has a formula selected from the group consisting of:

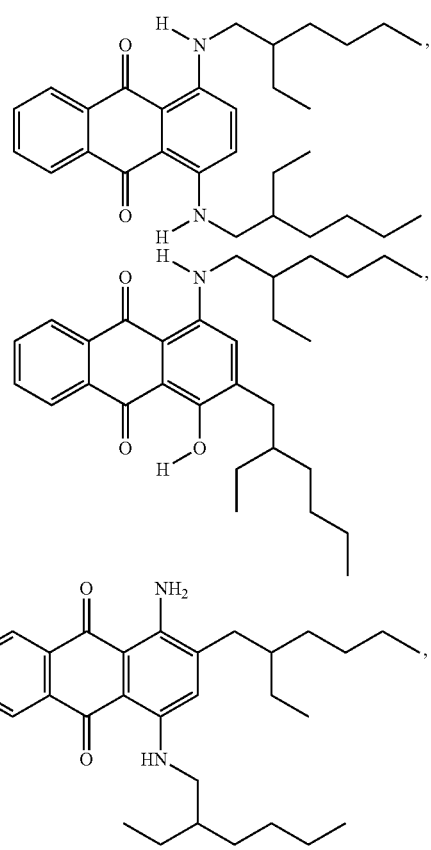

-continued

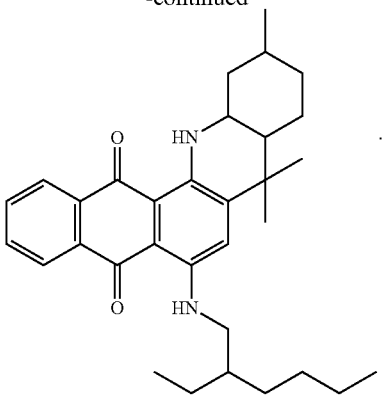

In other embodiments R2 and R4 are preferably cyclohexane. In exemplary embodiments the dye has a formula selected from the group consisting of:

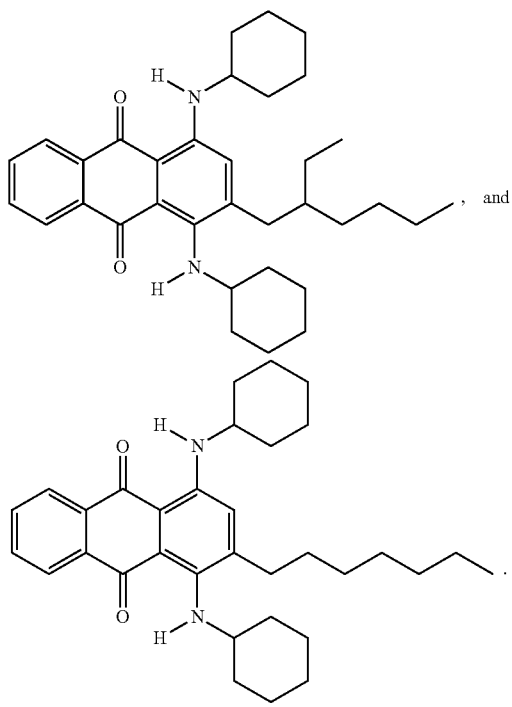

In further embodiments of the invention, the dye has the general formula:

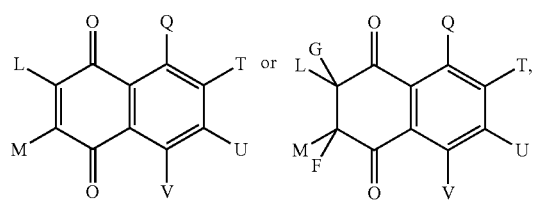

wherein at least one of F, G, L and M is H or an optionally branched and/or optionally cyclic alkyl group comprising 1 to 20 carbon atoms.

In some embodiments L and M are H. In other embodiments the dye has the general formula:

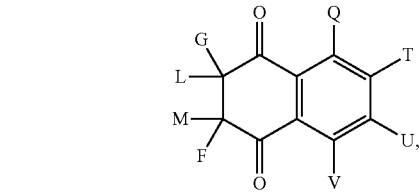

wherein F and G are H.

In further embodiments of the invention, at least one of R2 and R4 includes a functional group including two or more heteroatoms. Such functional groups may include a combination of any of the following heteroatoms: N, P, As, Sb, O, S, Se, Te, F, Cl, Br, I. In such groups of heteroatoms, a heteroatom may be bonded to another heteroatom, or may be separated from another heteroatom by a non-heteroatom or group of non-heteroatoms. In preferred embodiments, at least one of R2 and R4 may include a group of heteroatoms having a formula selected from the group consisting of: —O—O—, —N—O—, —N=N—, $SO_2$ and SO.

In other embodiments of the invention, at least one of T and U is a functional group including a heteroatom, T having the general formula: -Het3, -Het3R5 or -Het3R5R6, and U having the general formula: -Het4, -Het4R7 or -Het4R7R8, wherein Het3 and Het4 are heteroatoms such as N, P, As, Sb, O, S, Se, Te, F, Cl, Br, I and R5, R6, R7 and R8 are any functional group.

Further, at least one of R5, R6, R7 and R8 may be H or an optionally branched and/or optionally cyclic alkyl group comprising 1 to 20 carbon atoms.

According to another aspect of the present invention, there is provided a fluid for an electrowetting element, the fluid comprising a carrier fluid in which a dye of the present invention is substantially dissolved.

According to a further aspect of the present invention, there is provided an electrowetting element arranged for modifying a radiation beam characteristic and comprising a first and a second fluid which are immiscible with each other and are switchable between a first configuration and a second configuration by changing a voltage applied across at least one of the first and second fluids, wherein the first fluid includes the fluid of the present invention.

In addition to exhibiting reduced, or no, photo-bleaching, dyes of the present invention may also meet at least one further criterion for use in an electrowetting element. The fact that these dyes exhibit both reduced photo-bleaching and at least one further desirable criterion is surprising and advantageous. Such criteria include a dye colour; it is desirable that the dye when dissolved in the first fluid of an electrowetting element absorbs radiation of a particular wavelength, or range of wavelengths, to impart a required colour into a radiation beam passing through the element; thus the dye filters the passing radiation, and modifies a radiation beam characteristic. In this way, an image provided by a display device including the electrowetting element is of a high quality with desired colour characteristics, for accurately representing the image.

Preferably, the first fluid includes a carrier fluid in which the dye is substantially dissolved. A further criteria of a dye of the present invention is a suitable solubility for dissolving in the carrier fluid. The term "substantially dissolved" means that the dye dissolves in the carrier fluid to the extent that the first fluid in the electrowetting element operates correctly according to predetermined tolerances. For example, such tolerances may include a minimum speed at which the fluids of the element can be switched between different fluid configurations, and a minimum optical performance, including parameters such as wavelength absorption and optical clarity, which the dissolved dye conforms to. A dye of the present invention, when dissolved in the carrier fluid, preferably may also meet a criteria of a desired viscosity of the first fluid which provides for the correct operation of the element, at a dye concentration in the carrier fluid which is suitable for imparting the desired amount of colour into radiation passing through the element. Further, the dye preferably does not adversely affect, and may contribute to, a desired interfacial tension between the first fluid and the second fluid and/or other parts of the element, such as the hydrophobic layer, so that the element operates correctly.

Further preferably, the carrier fluid is substantially non-polar. "Substantially non-polar" means that greater than 50%, preferably greater than 75%, and further preferably greater than 90% of the carrier fluid is non-polar.

In advantageous embodiments, the carrier fluid comprises an alkane. The dyes of the present invention are advantageously dissolvable in the alkane of the carrier fluid, to provide correct operation of the electrowetting element.

In embodiments, an extent of interactions between the dye and the carrier fluid is arranged to reduce photo-bleaching. Accordingly, photo-bleaching may be reduced by selecting an extent of chemical and/or physical interactions between molecules of the dye with molecules of the carrier fluid.

In exemplary embodiments, if the carrier fluid is substantially non-polar, the extent of interactions between the dye molecules and the carrier fluid molecules may be low, or non-existent; this may reduce or prevent photo-bleaching. In further embodiments, the low extent of, or no, interactions between the dye and carrier fluid may also prevent the colour of the dye from changing when dissolved in the carrier fluid; this helps to obtain a desired colour of the first fluid.

Further, in other embodiments, a reduced concentration of oxygen in the first fluid reduces photo-bleaching. For example, a low, near zero, or zero oxygen concentration may contribute to reduce or prevent photo-bleaching of the dye.

In other embodiments, the fluid may comprise at least one further dye substantially dissolved in the carrier fluid. Interactions between the molecules of the different dyes, and/or between the further dye and carrier fluid molecules, may contribute to reduce or prevent photo-bleaching. By mixing dyes, which may be of different colours, there may be a greater degree of design freedom for providing a first fluid which meets criteria desired for the electrowetting element, such as reduced photo-bleaching and colour.

In another aspect of the present invention, a dye of the present invention is used to reduce photo-bleaching in a fluid of an electrowetting element.

In a yet further aspect, there is provided an optical display device comprising at least one electrowetting element of the present invention. For example, an optical display device may be provided comprising three electrowetting elements, which together form a display pixel. The carrier fluid of each of the three electrowetting elements may be dyed with a different coloured dye, for example one of magenta, cyan and yellow, so that the beam may be imparted with a plurality of different colours by differently switching the three electrowetting elements. Accordingly, using three dyes which each have reduced, or no, photo-bleaching, allows different coloured radiation to be provided independently, to provide a full colour pixel with reduced photo-bleaching properties. With a plurality of these pixels, a full colour display can be provided which is capable of providing a high quality image over an operational lifetime.

Further features and advantages of the invention will become apparent from the following description of preferred embodiments of the invention, given by way of example only, which is made with reference to the accompanying drawing.

BRIEF DESCRIPTION OF THE DRAWING

FIG. 1 shows a schematic cross-section of part of an exemplary known display device.

DETAILED DESCRIPTION OF THE INVENTION

FIG. 1 shows a schematic cross-section of part of an exemplary known display device 1. The display device includes a plurality of electrowetting elements 2, one of which is shown in the FIGURE. The lateral extent of the element is indicated in the Figure by the two dashed lines 3, 4. The electrowetting elements comprise a first support plate 5 and a second support plate 6. The support plates may be separate parts of each electrowetting element, but the support plates are preferably in common for the plurality of electrowetting elements. The support plates may be made for instance of glass or polymer and may be rigid or flexible.

The display device has a viewing side 7 on which an image formed by the display device can be viewed and a rear side 8. The first support plate faces the viewing side; the second support plate faces the rear side. The image is formed by light passing through each electrowetting element from the rear side 8 to the viewing side 7, where it is transmitted through the first support plate 5. Alternatively, the element may include a reflector for reflecting light, entering the element from the viewing side 7 back through the viewing side 7. Such a reflective element may alternatively be constructed with the features described below of the first fluid 12, the electrode 14, the hydrophobic layer 13 and the walls 16 being adjacent the first support plate 5. The image is built up of picture elements. Each picture element, i.e. a pixel, may contain a single electrowetting element. Alternatively, each picture element may contain a plurality of electrowetting elements, each electrowetting element forming a sub-picture element. A plurality of picture elements can be arranged in a matrix to provide an optical display device for displaying an image to a viewer.

An illumination unit 9 may be attached to the rear side 8 of the plurality of electrowetting elements to provide backlighting of the electrowetting elements. The illumination unit may comprise a single white light source. It may also comprise a plurality of colour light sources e.g. for spectrum sequential operation of the display. The colours of the light sources may for example be yellow and blue. The light sources may be conventional light sources, such as fluorescent lamps or LEDs. The illumination unit may be of a conventional construction, such as disclosed for instance in international patent application WO 2006/011101.

A space 10 between the support plates is filled with two fluids: a first fluid 12 and a second fluid 11 which in this embodiment are each a liquid. The first fluid is immiscible with the second fluid. The second fluid is electrically conductive or polar, and may be a water or salt solution such as a solution of potassium chloride (KCl) in a mixture of water and ethyl alcohol. The second fluid is preferably transparent. The first fluid is electrically non-conductive and substantially non-polar and includes a carrier fluid of for instance an alkane such as hexane, heptane, octane, nonane, decane, undecane, dodecane, tridecane, tetradecane, pentadecane, oil such as silicone oil, or a cyclic alkane such as decaline (otherwise known as bicyclo-4,4.0-decane). The carrier fluid may comprise a mixture of at least two of these alkanes and oils, for example if the first fluid includes a mixture of more than one dye.

A hydrophobic layer 13 is arranged on the electrode 14, facing the space 10. The layer may be an uninterrupted layer extending over a plurality of electrowetting elements or it may cover only the cross-section of one electrowetting element. The layer may be for instance an amorphous fluoropolymer layer such as AF1600 or other low surface energy polymers. The hydrophobic character causes the first fluid to adhere preferentially to the support plate 6.

Each electrowetting cell includes an electrode 14 arranged on the support plate 6. The electrode is separated from the fluids by an insulator which may be Parylene or the hydrophobic layer 13. In general, the electrode has the same shape as the cross-section of the electrowetting element, but in other embodiments the electrode may have a different shape than the cross-section of the electrowetting element. A second electrode 15 is connected to the conductive second fluid 11. This electrode can be common to a series of electrowetting cells that share the second fluid, uninterrupted by walls that connect the first and second support plate. The electrodes on the support plate 6 are connected to an electrical terminal on the support plate by a matrix of printed wiring. The electrodes 14 and wiring are preferably transparent and made of e.g. indium tin oxide or reflecting and made of e.g. aluminium. The matrix may include switching elements such as transistors; in this case the matrix is called an active matrix.

The lateral extent of the first fluid 12 is constrained to one electrowetting element by walls 16 or hydrophilic areas that follow the cross-section of the electrowetting cell. Further details of the electrowetting cell and its manufacture are disclosed amongst others in international patent application WO 2005/098797.

The first fluid absorbs at least a part of the optical spectrum. The fluid may be transmissive for a part of the optical spectrum, forming a colour filter. For this purpose the fluid may be coloured by addition of pigment particles or a dye. Alternatively, the fluid may be black, i.e. absorb substantially all parts of the optical spectrum.

When a nonzero voltage is applied between the electrodes 14 and 15, electrostatic forces will move the second fluid 11 towards the electrode 14, thereby repelling the first fluid 12 from the area of the electrode 14 to the walls 16 surrounding the area of the electrode. The repelled fluid is schematically indicated by a dashed line 17. This action removes the first fluid from an optical path OP that runs from the rear side 8 to the viewing side 7 through the electrowetting element. In an embodiment where the element reflects light entering the viewing side 7 back out through the viewing side 7, this action removes the first fluid substantially from the path of the incident and reflected light. When the voltage is returned to zero, the first fluid flows back to cover the hydrophobic layer 13. In this way the first fluid forms an electrically controllable light switch whereby the first and second fluids 12, 11 are switchable between a first configuration of the fluids and a second configuration of the fluids. The first configuration corresponds with the position of the fluids 11, 12 when the first fluid 12 has the position indicated by dashed line 17. The second configuration corresponds with the position of the fluids 11, 12 when the first fluid 12 covers the hydrophobic layer 13.

In the above description of the electrowetting cell the first fluid 12 either covers the area of the electrode 14 or is removed from it. International patent application WO 2003/071346 discloses measures that allow the first fluid to cover the area of the electrode 14 only partially, thereby realizing so-called grey values.

If a dye is used in the first fluid 12, for example an anthraquinone dye or a naphthoquinone dye, photo-bleaching of the dye may be observed over a period of time. Accordingly, a quality of the image provided by the display device may deteriorate.

In accordance with the present invention, anthraquinone dyes and naphthoquinone dyes will now be described. At least one of these dyes may be substantially dissolved in the carrier fluid of the first fluid of an electrowetting element according to that described in FIG. 1. Accordingly, embodiments of the present invention include an electrowetting element with a dye of the present invention substantially dissolved in the carrier fluid, and in other embodiments an optical display device comprising at least one such electrowetting element. Since the dyes of the present invention reduce photo-bleaching, such an electrowetting element exhibits a reduced, or no, photo-bleaching over a prolonged period of time.

The dyes of the present invention include anthraquinone dyes having the general formula:

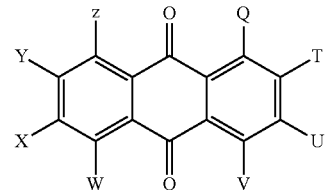

and naphthoquinone dyes having the general formula:

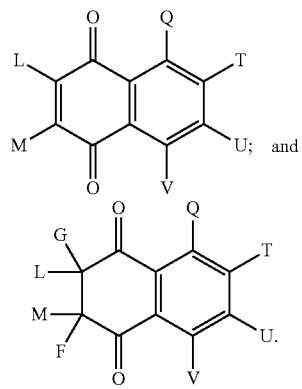

where Q has the general formula: -Het1R1 or -Het1R1R2;

V has the general formula: -Het2R3 or -Het2R3R4;

Het1 and Het2 are heteroatoms;

R1 and R3 are H (i.e. hydrogen);

R2 and R4 are any functional group;

T and U are any functional group;

W, X, Y and Z are H or an alkyl group; and

F, G, L and M are H or an alkyl group, and with the proviso that said dye does not have the general formula:

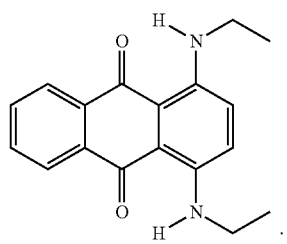

11

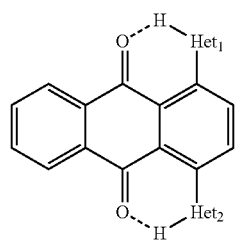

12

At least one of R2, R4, T, U, W, X, Y, Z, F, G, L and M may be H or an optionally branched and/or optionally cyclic alkyl group comprising 1 to 20 carbon atoms. Further, W, X, Y and Z may all be H, and T and U may also be H. In other embodiments, L and M may both be H, and for appropriate embodiments F and G may be H too. In preferred embodiments, R2 and R4 are both optionally branched and/or optionally cyclic alkyl groups comprising 1 to 20 carbon atoms. In other preferred embodiments, R2 and R4 are both cyclo-hexane.

In embodiments of the invention, at least one of R2 and R4 include a functional group including two or more heteroatoms. Such a group of heteroatoms may be a combination of the following heteroatoms: N, P, As, Sb, O, S, Se, Te, F, Cl, Br, I, and includes a group of heteroatoms having a formula of for example —O—O—, —N—O—, —N=N—, $SO_2$ and SO.

In further embodiments, at least one of T and U is a functional group including a heteroatom, T having the general formula: -Het3, -Het3R5 or -Het3R5R6, and U having the general formula: -Het4, -Het4R7 or -Het4R7R8, wherein Het3 and Het4 are heteroatoms such as any of N, P, As, Sb, O, S, Se, Te, F, Cl, Br and I, and R5, R6, R7 and R8 are any functional group. R5, R6, R7 and R8 may be H or an optionally branched and/or optionally cyclic alkyl group comprising 1 to 20 carbon atoms.

Any of the alkyl groups described above and below may comprise 1 to 20, 4 to 16, or 8 to 12 carbon atoms. It is to be appreciated that for such alkyl groups all intermediate integer values of the number of carbons between the specified values of 1 and 20 should be taken as described herein also. For example, the alkyl group may comprise 5 carbon atoms. The optionally cyclic alkyl group may be for example cyclo-pentane, cyclo-hexane, cyclo-heptane.

Exemplary dyes of the present invention will be described further below. First, an explanation of why the dyes of the present invention reduce or prevent photo-bleaching is given.

Without being bound to any theory, the dyes of the present invention are believed to counter photo-bleaching by Q and V each including a heteroatom bonded to the right hand benzene ring of the anthraquinone or naphthoquinone structure of the general formula of the dyes of the invention illustrated herein. In the present invention Q has the general formula -Het1H or -Het1HR2, and V has the general formula -Het2H or -Het2HR4, i.e. R1 and R3 are each H. In such structures, the H bonded to Het1 is believed to form an intermediate bond, i.e. a bridge, with the oxygen of the adjacent C=O group of the anthraquinone or naphthoquinone structure. Similarly, the H bonded to Het2 is believed to bridge to the oxygen of the adjacent other C=O of the anthraquinone or naphthoquinone structure. This is illustrated below for an anthraquinone dye using dashed lines:

It is to be appreciated that similar bridging may occur for a naphthoquinone dye of the present invention. It is believed that such bridging gives greater electron delocalisation throughout the anthraquinone or naphthoquinone dye, and therefore stabilises the structure against photo-bleaching by allowing the dye molecule to absorb greater radiation energy without the dye molecule breaking. The energy of the bridging interactions is influenced by the specific electronegativity of the heteroatom of Het1 and Het2. Further, if at least one of Q and V includes a group of heteroatoms, as described above, the electronegativity of those heteroatoms may influence the formation of the bridging interactions. Also, the strength of the bridging may be affected by the distance between the oxygen of the C=O groups of the anthraquinone or naphthoquinone and the hydrogen bonded to the heteroatoms Het1 or Het2, and also the amount of charge on the O of the C=O group and on the H bonded to heteroatoms Het1 or Het2. In embodiments exhibiting such bridging, Q and V may for example have a formula selected from the group consisting of: —OH, —NHR2 or —NHR4.

The reduction in susceptibility to photo-bleaching of the anthraquinone and naphthoquinone dyes of the present invention may also be influenced by the nature of the functional groups T and U. If T and U include a heteroatom, their electronegativity may affect electron delocalisation in the anthraquinone or naphthoquinone structure, and accordingly affect the strength of the bridging interactions of the -Het1-H and Het2-H groups with the C=O groups.

If any of functional groups Q, T, U, V, W, X, Y, Z, F, G, L and M include an alkyl group, the alkyl group may influence the strength of the bridging interactions, and perhaps whether the bridging interactions occur in the first instance. This influence depends on the length and conformation of such alkyl groups, and the nature of any branching and/or the presence of any cyclic alkyls of these alkyl groups. For example, if V is an alkyl group of sufficient length, it may adopt a conformation where it can wrap around at least part of the anthraquinone or naphthoquinone structure to interfere with and maybe prevent any interaction between the hydrogens of the -Het1-H and/or -Het2-H groups with the adjacent C=O groups of the anthraquinone or naphthoquinone. Thus, with a weakened bridging caused by such alkyl group interference, the dye molecule may be more susceptible to photo-bleaching. Further, such alkyl groups may influence the bridging by modifying the electronegativity of any heteroatoms of the dye structure. Also, the steric size of any such alkyl groups may interfere with the bridging.

Furthermore, it is believed that dyes of the invention may have reduced photo-bleaching through the extent of their specific interactions with the carrier fluid. Such interactions may be chemical and/or physical interactions between molecules of the dye with molecules of the carrier fluid. The specific structure of the dye and the carrier fluid will influence the nature of such interactions. In particular, factors such as local or transient molecular polarity, steric size, stereochemistry, and the functional groups of the dye and carrier molecules may contribute to such interactions. In other embodiments, any such interactions may alternatively be few, or non-existent, which may help reduce or prevent photo-bleaching.

Depending on the specific dye of the first fluid, the concentration of oxygen in the first fluid may influence the extent of any photo-bleaching that the dye exhibits. Accordingly, in embodiments of the invention, it is desirable for the first fluid to have a low oxygen concentration. Preferably the first fluid is free from oxygen.

The structure of dyes of the present invention can be chosen so as to determine their colour, i.e. their ability to absorb radiation of a certain wavelength or range of wavelengths, so that, when substantially dissolved in the carrier fluid of the first fluid the dye imparts a desired colour in radiation passing through the electrowetting element. Advantageously, at least some of the dyes of the present invention have a desired colour whilst also having favourable reduced photo-bleaching properties; in other words, tuning the colour of the molecule advantageously does not necessarily prevent or compromise the photo-bleaching resistant properties of the dye. Controlling of a colour of an anthraquinone dye through molecular structure is known from the thesis entitled "Elaboration of a Theoretical Procedure for the Evaluation and Prediction of the Carbonyl Dyes Colour", by Julien Preat and published on 14 Mar. 2008; the contents of this publication is incorporated herein by way of reference. This thesis investigates the effect of an auxochrome (a chemical group including a heteroatom, the auxochrome being directly attached to an anthraquinone) on the resulting colour of the dye. The colour of naphthoquinone dyes may be controlled in a similar manner. This is confirmed, for example, by experimental comparison of absorption spectra of anthraquinones and corresponding naphthoquinones, for example those described in "Synthesis of 5-Amino-8-hydroxy-1,4-naphthoquinone and Derivatives"; Francisco Fariña*, Roberto Martinez-Utrilla, M. Carmen Paredes, Valter Stefani, *Instituto de Química Orgánica General (C. S. I. C.), Juan de la Cierva 3, 28006 Madrid, Spain; Synthesis 1985; 1985: 781-784; DOI: 10.1055/s-1985-31347, the contents of which is incorporated herein by way of reference. Bridging between hydrogen atoms and C═O groups of the anthraquinone or the naphthoquinone, as described before, also influences the colour of the dyes of the invention. The extent of electron delocalisation in the dye molecule influences the energy levels of the molecule, and therefore the radiation wavelengths which the dye absorbs. Accordingly, factors affecting the extent of electron delocalisation in the dye molecule influence the colour of the dye. Therefore, such factors can be modified to tune the colour of the dye. Such factors include those described previously which affect the extent of the bridging interactions, and indeed whether the bridging interactions occur in the first place; for example, the electronegativity of any heteroatom in the functional groups Q, T, U and V, and also the length and conformation of any alkyl groups of the functional groups Q, T, U, V, W, X, Y, Z, F, G, L and M.

To obtain a desired colour of the first fluid, the first fluid may include more than one dye, each dissolved in the carrier fluid. In this way, a mixture of dyes may be used to tune the colour. It is envisaged that each dye of such a mixture may have reduced or no susceptibility to photo-bleaching. Alternatively, interactions between the different dye molecules in the mixture may reduce or prevent photo-bleaching.

The dyes of the present invention preferably dissolve in the carrier fluid of the first fluid. The solubility of the dyes may be controlled, by selecting a certain dye structure, to ensure they substantially dissolve in the carrier fluid. Advantageously, the dyes of the invention may therefore be tuned to have a desired solubility, in addition to a desired colour and resistance to photo-bleaching. The solubility of the dyes may be controlled by modifying the length and/or any branching of, or by introducing cyclo alkyl groups into, an alkyl group of any of Q, T, U, V, W, X, Y, Z, F, G, L and M. In this way, the alkyl groups may be selected to interact favourably with the molecules of the carrier fluid. Further, a heteroatom of any of Q, T, U or V, or a lack of a heteroatom in T and/or U, may influence the solubility of the dye. In preferred embodiments, T is H, a methyl group or is -Het3R5 where R5 is a methyl group. In other preferred embodiments giving a desired solubility, Q and U include an alkyl group with 4 to 20 carbon atoms, and preferably 8 to 12 carbon atoms, and V is -Het2H or includes at least one alkyl group with 1 to 20 carbon atoms or includes a cyclo-alkane bonded to the heteroatom Het2.

Dyes of the present invention may exhibit a low, or no, backflow. Backflow is the phenomenon where, with a voltage applied and maintained between the electrodes 14 and 15, the configuration of the fluids tends to change back to the fluid configuration adopted when a zero voltage is applied across the electrodes. Backflow causes a deterioration in a quality of an image displayed by an electrowetting display device. Certain dyes, such as those having no overall polarisation, reduce or even prevent backflow from occurring. Further details on dyes which reduce or eliminate backflow are described in PCT patent publication no. WO/2005/098524, the content of which is incorporated herein by way of reference.

Dyes of the present invention for use in the first fluid of the electrowetting element may have no overall polarisation so as to advantageously provide the desirable criteria of low or no backflow. Moreover, such dyes may have low or no photo-bleaching over a prolonged period of time, and have desired colour absorption and solubility properties. Advantageously, this provides a greater degree of freedom for developing dyes of the present invention for use in an electrowetting element, without compromising one desirable dye property when achieving another desirable dye property.

Exemplary dye compounds will now be described below, including a schematic illustration of each dye. Whilst exemplary anthraquinone dyes are given below, it is to be appreciated that corresponding napthoquinone dyes are envisaged also within the scope of the present invention, namely including napthoquinones having the same molecular structure of the right hand (as illustrated herein) benzene ring as the molecular structure of the right hand (as illustrated herein) benzene ring of the anthraquinone examples described below. The stereochemistry of each dye is not limited to that shown; it is to be appreciated that molecular structures of the dyes having different stereochemistry are within the scope of the dyes of the invention. The exemplary dyes do not exhibit photo-bleaching, at least over an acceptable time period for use in an electrowetting element. For each of the exemplary dyes, data is given as evidence of their reduced photo-bleaching properties. This data was obtained by testing each exemplary dye according to the standard IEC 60068-2-9, using an Atlas Suntest CPS/XLS+ instrument. The periods of time given for testing are scalable to equate to a number of weeks of exposing the tested dyes to solar radiation. For example, the period of exposure of 240 hours given below approximately equates to continuously exposing the dyes to solar radiation in London, UK, for 14 weeks, taking an average yearly solar radiation quantity as 1,000 kWh/m2/year. In reality, taking into account that a display application is not used or is used inside for a major part of the time, this equates to a few years of practical lifetime.

Example 1

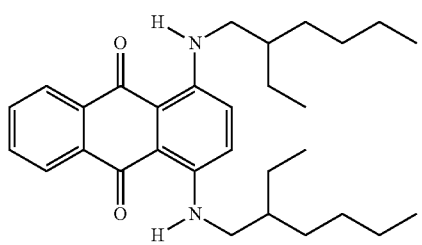
(1)

This dye is cyan in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, 120 and 240 hours. The reflectance of the dye for the range of wavelengths tested was approximately the same for each different testing time period. Accordingly, this dye does not exhibit photo-bleaching.

Dye (1) may be synthesised from Leucoquinizarin, which is available from Sigma-Aldrich, having the website address http://www.sigmaaldrich.com and registered office in the State of Delaware, No. 100 West Tenth Street, in the City of Wilmington, County of New Castle, U.S.A. Leucoquinizarin (otherwise known as quinizarin) is reacted with 2-ethylhexylamine in 1-butanol under reflux and readily gives dye (1).

Example 2

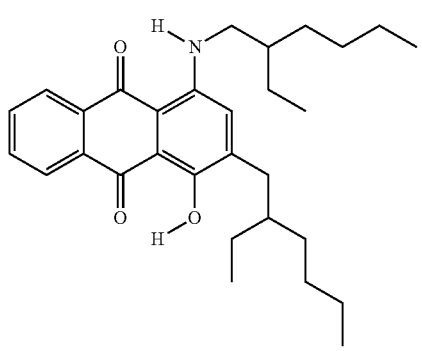
(2)

This dye is purple in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, and 120 hours. The reflectance of the dye for the range of wavelengths tested was approximately the same for each different testing time period. Accordingly, this dye does not exhibit photo-bleaching.

Dye (2) may be synthesised from Leucoquinizarin, which is available from Sigma-Aldrich. Leucoquinizarin is reacted with 2-ethylhexylamine, followed by piperidinium acetate; a catalyzed reaction of the product imine with 2-ethylhexanal yields dye (2) in a fairly good yield.

Example 3

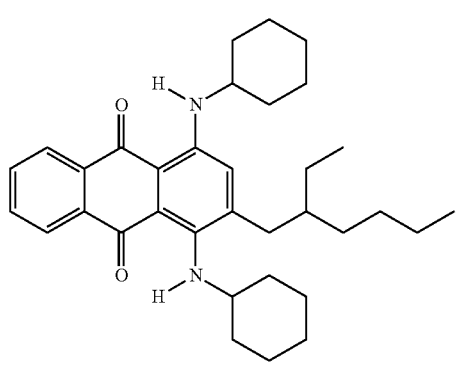
(3)

This dye is magenta in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, 120 and 240 hours. The reflectance of the dye for the range of wavelengths tested was approximately the same for each different testing time period. Accordingly, this dye does not exhibit photo-bleaching.

Dye (3) may be synthesised from Leucoquinizarin, which is available from Sigma-Aldrich. Leucoquinizarin can be converted quite easily to 2-(2-ethylhexyl)-1,4-dihydroxyanthraquinone. Reaction of the resulting compound with cyclohexylamine in the presence of a small amount of sodium dithionite leads to dye (3).

Example 4

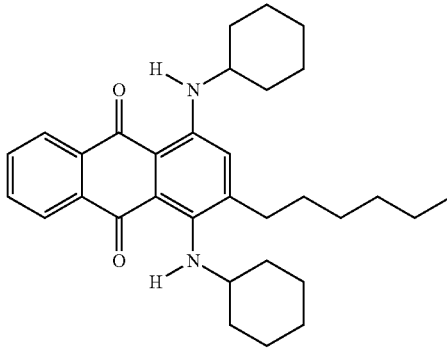
(4)

This dye is magenta in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, 120 and 240 hours. The reflectance of the dye for the range of wavelengths tested was approximately the same for each different testing time period. Accordingly, this dye does not exhibit photo-bleaching.

Dye (4) may be synthesised from Leucoquinizarin, which is available from Sigma-Aldrich. When 2-heptyl-1,4-dihydroxyanthraquinone, which is derivable from Leucoquinizarin,—is heated under reflux with cyclohexylamine, a rather good conversion to dye (4) is observed.

Example 5

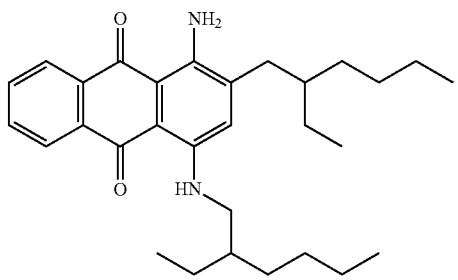

(5)

This dye is blue in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, and 120 hours. The reflectance of the dye for the range of wavelengths tested was approximately the same for each different testing time period. Accordingly, this dye does not exhibit photo-bleaching.

Dye (5) may be synthesised from Leucoquinizarin, which is available from Sigma-Aldrich. Leucoquinizarin can be converted quite easily to 2-(2-ethylhexyl)-1,4-dihydroxyanthraquinone. Reaction of the resulting compound with Ditosylate and 2-ethylhexylamine in Dimethyl sulfoxide leads to a mixture where dye (5) can be isolated.

Example 6

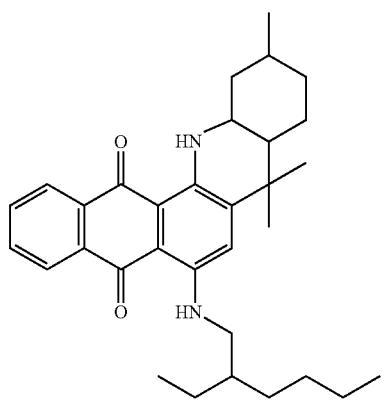

(6)

This dye is blue/cyan in colour. Upon testing, a sample of the dye with a thickness of 4 micrometers, a circular area of 1 centimeter diameter and a concentration of 0.1M in decane, was measured for reflectance of radiation with wavelengths from 380 to 750 nano-meters, at 5 nano-meter increments. This test was run separately for different time periods, namely for 0, 4, 24, 48, and 120 hours. The reflectance of the dye for the range of wavelengths tested was approximately the same for each different testing time period. Accordingly, this dye does not exhibit photo-bleaching.

Dye (6) may be synthesised from 1-aminoanthraquinone, which is available from Sigma-Aldrich. Reactions of 1-aminoanthraquinone with Citronellal catalyzed by Trifluoroacetic acid followed by bromine (Br2) in pyridine and then by 2-ethylhexylamine, leads to dye (6).

The above embodiments are to be understood as illustrative examples of the invention. Further embodiments of the invention are envisaged. For example, display device 1 may have a different construction from that described above using FIG. 1. Further, it is envisaged that a plurality of the electrowetting elements of the invention may be arranged as a matrix in an optical display device to display images.

Further molecular structures of the dyes of the present invention from those examples described above are envisaged which are resistant if not immune to photo-bleaching, and which may also have desirable colour, solubility, reduced backflow, and any other properties desirable for the dye to be used in the first fluid of an electrowetting element.

It is envisaged that additional anthraquinone and naphthoquinone dyes from those described previously may also provide reduced photo-bleaching. Such dyes include those with the general formula selected from the group consisting of:

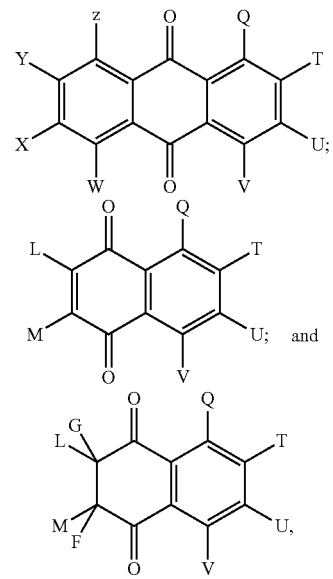

where Q has the general formula: -Het1, -Het1R1 or -Het1R1R2;

V has the general formula: -Het2, -Het2R3 or -Het2R3R4;

Het1 and Het2 are heteroatoms;

R1, R2, R3 and R4 are any functional group;

T and U are any functional group;

W, X, Y and Z are H or an alkyl group; and

F, G, L and M are H or an alkyl group, and with the proviso that the dye does not have the general formula:

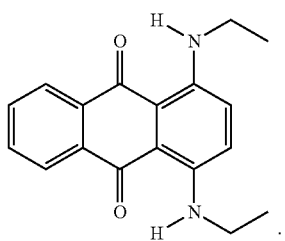

Such additional dyes include those dyes where only one of R1, R2, R3 and R4 is H, and dyes where none of R1, R2, R3 and R4 are H; such dyes therefore do not form the above-described H—O═C bridging interactions with both C═O groups of the dye structure, yet still reduce photo-bleaching. For such dyes, another mechanism than the above-described H—O═C bridging operates to reduce photo-bleaching. For such dyes, Het1 and/or Het2 may be any of the following heteroatoms: N, P, As, Sb, O, S, Se, Te, F, Cl, Br and I. Further, R1 and/or R3 may be any of the functional groups, such as alkyl groups, described above for R2 and R4. Moreover, for such non H—O═C bridging dyes, R2, R4, T, U, W, X, Y, Z, F, G, L and M may be, respectively, any of the functional groups described above for R2, R4, T, U, W, X, Y, Z, F, G, L and M. It is to be appreciated that such additional dyes may also exhibit other desirable criteria, such as those described above, including a specific colour and reduced backflow. It is further to be understood that the additional dyes may be dissolved in a carrier fluid as described above, to provide an electrowetting element corresponding to that described previously.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An electrowetting element comprising a first support plate, a second support plate and an electrode,
    wherein a space between the support plates contains a first fluid and a second fluid, wherein:
    the first fluid is immiscible with the second fluid;
    the second fluid is at least one of electrically conductive or polar; and
    the first fluid comprises a non-polar carrier fluid in which is dissolved a dye having a general formula selected from the group consisting of:

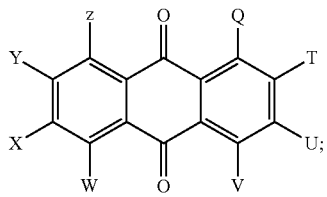

-continued

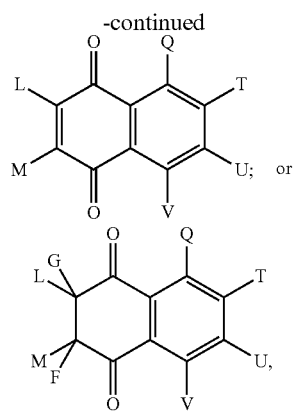

wherein Q has the general formula: -Het1R1 or -Het1R1R2;
    V has the general formula: -Het2R3 or -Het2R3R4;
    Het1 and Het2 are heteroatoms;
    R1 and R3 are H;
    R2 and R4 are both at least one of H, an alkyl group comprising 1 to 20 carbon atoms, a branched alkyl group comprising 1 to 20 carbon atoms or a cyclic alkyl group comprising 1 to 20 carbon atoms, and at least one of R2 and R4 comprises at least one of a branched alkyl group comprising 4 to 16 carbon atoms or a cyclic alkyl group comprising 4 to 16 carbon atoms; T and U are at least one of H, an alkyl group comprising 1 to 20 carbon atoms, a branched alkyl group comprising 1 to 20 carbon atoms, a cyclic alkyl group comprising 1 to 20 carbon atoms, or a functional group including a heteroatom, wherein where T is said functional group including a heteroatom, T has the general formula: -Het3, -Het3R5 or -Het3R5R6, and where U is said functional group including a heteroatom, U has the general formula: -Het4, -Het4R7 or -Het4R7R8, wherein Het3 and Het4 are heteroatoms and R5, R6, R7 and R8 are at least one of H, an alkyl group comprising 1 to 20 carbon atoms a branched alkyl group comprising 1 to 20 carbon atoms or a cyclic alkyl group comprising 1 to 20 carbon atoms;
    W, X, Y and Z are H or an alkyl group; and
    F, G, L and M are H or an alkyl group.

2. An electrowetting element according to claim 1, wherein at least one of T and U is at least one of an alkyl group comprising 1 to 20 carbon atoms, a branched alkyl group comprising 1 to 20 carbon atoms or a cyclic alkyl group comprising 1 to 20 carbon atoms.

3. An electrowetting element according to claim 1, wherein T and U are H.

4. An electrowetting element according to claim 1, wherein any one of R2, R4, T and U includes a cyclic alkyl group selected from the group consisting of: cyclo-pentane, cyclo-hexane or cyclo-heptane.

5. An electrowetting element according to claim 1, wherein R2 and R4 are both at least one of branched alkyl groups comprising 4 to 16 carbon atoms or cyclic alkyl groups comprising 4 to 16 carbon atoms.

6. An electrowetting element according to claim 1, wherein the H of each of R1 and R3 is arranged to form a bridging interaction with a C═O group of said dye.

7. An electrowetting element according to claim 6, wherein at least one of Q and V has a formula selected from the group consisting of: —OH, —NHR2 or —NHR4.

8. An electrowetting element according to claim 1, said dye having the general formula:

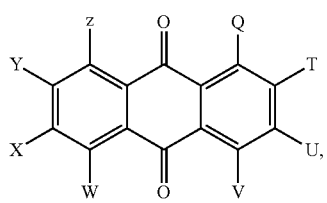

wherein at least one of W, X, Y and Z is at least one of H, an alkyl group comprising 1 to 20 carbon atoms, a branched alkyl group comprising 1 to 20 carbon atoms or a cyclic alkyl group comprising 1 to 20 carbon atoms.

9. An electrowetting element according to claim 8, wherein any one of W, X, Y and Z includes a cyclic alkyl group selected from the group consisting of: cyclo-pentane, cyclo-hexane or cyclo-heptane.

10. An electrowetting element according to claim 8, wherein W, X, Y and Z are H.

11. An electrowetting element according to claim 10, said dye having a formula selected from the group consisting of:

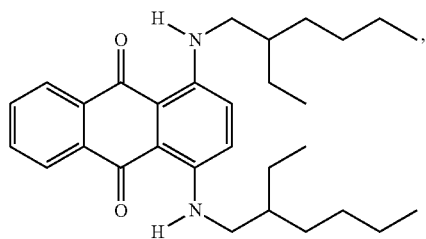

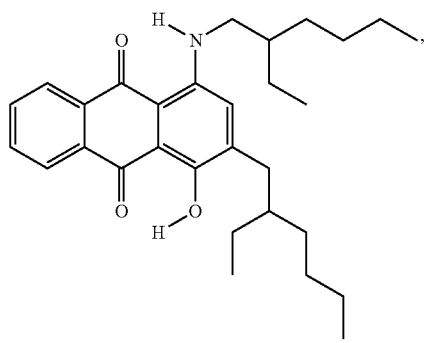

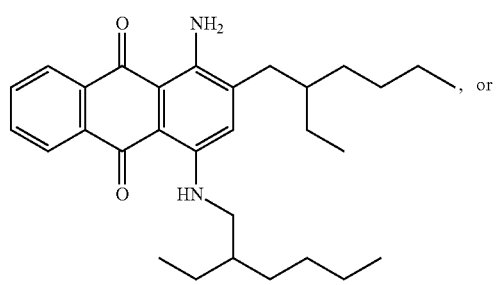

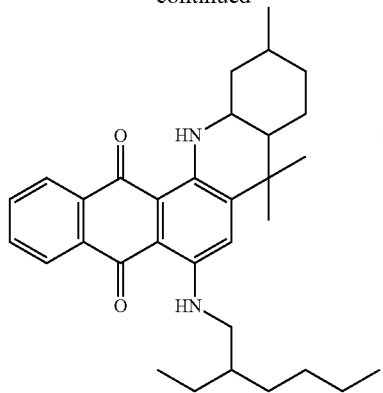

12. An electrowetting element according to claim 8, wherein R2 and R4 are cyclo-hexane.

13. An electrowetting element according to claim 10, said dye having a formula selected from the group consisting of:

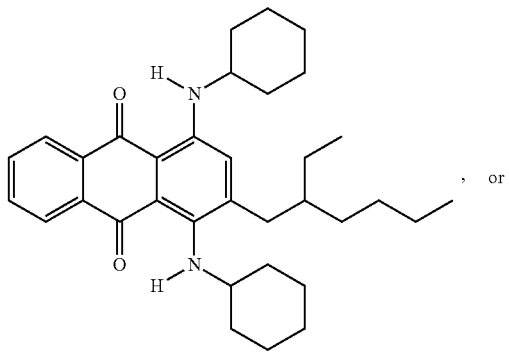

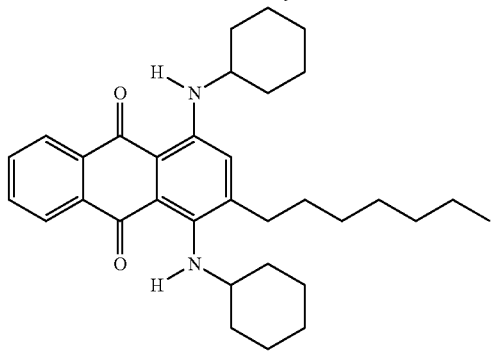

14. An electrowetting element according to claim 1, said dye having the general formula:

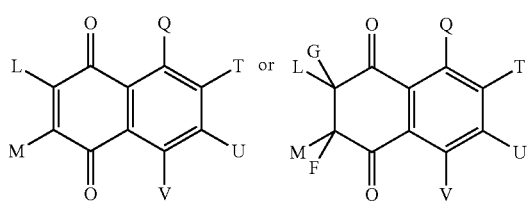

wherein at least one of F, G, L and M is at least one of H, an alkyl group comprising 1 to 20 carbon atoms, a branched alkyl group comprising 1 to 20 carbon atoms or a cyclic alkyl group comprising 1 to 20 carbon atoms.

15. An electrowetting element according to claim 14, wherein L and M are H.

16. An electrowetting element according to claim 15, said dye having the general formula:

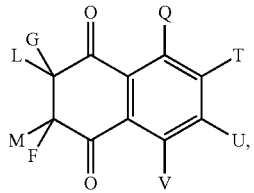

wherein F and G are H.

17. An electrowetting element according to claim 1, wherein at least one of T and U is a functional group including a heteroatom, T having the general formula: -Het3, -Het3R5 or -Het3R5R6, and U having the general formula: -Het4, -Het4R7 or -Het4R7R8, wherein Het3 and Het4 are heteroatoms and R5, R6, R7 and R8 are at least one of H, an alkyl group comprising 1 to 20 carbon atoms, on a branched alkyl group comprising 1 to 20 carbon atoms or on a cyclic alkyl group comprising 1 to 20 carbon atoms.

18. An electrowetting element according to claim 1, wherein the carrier fluid comprises an alkane.

19. An electrowetting element according to claim 1 comprising at least one further dye dissolved in the carrier fluid.

20. An optical display device comprising at least one electrowetting element of claim 1.

21. An electrowetting element according to claim 10, wherein T is H, U is one of an alkyl group comprising 1 to 20 carbon atoms, a branched alkyl group comprising 1 to 20 carbon atoms, or a cyclic alkyl group comprising 1 to 20 carbon atoms, Q has the formula —NHR2 wherein R2 is one of: a branched alkyl group comprising 4 to 16 carbon atoms, or a cyclic alkyl group comprising 4 to 16-carbon atoms, and V is OH.

22. An electrowetting element according to claim 21, wherein the alkyl group of U is one of: a branched alkyl group, or a cyclic alkyl group.

23. An electrowetting element according to claim 10, wherein T has the formula -Het3R5 wherein Het3 is S and R5 is one of an alkyl group comprising 1 to 20 carbon atoms, a branched alkyl group comprising 1 to 20 carbon atoms, or a cyclic alkyl group comprising 1 to 20 carbon atoms, U is H, Q has the formula —NHR2, wherein R2 is one of an alkyl group comprising 1 to 20 carbon atoms, a branched alkyl group comprising 1 to 20 carbon atoms, or a cyclic alkyl group comprising 1 to 20 carbon atoms, and V has the formula —NHR4 wherein R4 is one of: a branched alkyl group comprising 4 to 16 carbon atoms, or a cyclic alkyl group comprising 4 to 16 carbon atoms.

24. An electrowetting element according to claim 23, wherein at least one of the alkyl group of R5 and the alkyl group of R2 is one of: a branched alkyl group, or a cyclic alkyl group.

* * * * *